United States Patent
Salkintzis

(10) Patent No.: US 10,667,181 B2
(45) Date of Patent: May 26, 2020

(54) PDU SESSIONS WITH VARIOUS TYPES OF SESSION CONTINUITY

(71) Applicant: Motorola Mobility LLC, Chicago, IL (US)

(72) Inventor: Apostolis K Salkintzis, Athens (GR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/090,600

(22) Filed: Apr. 4, 2016

(65) Prior Publication Data

US 2017/0290082 A1  Oct. 5, 2017

(51) Int. Cl.

| | | |
|---|---|---|
| H04W 36/00 | (2009.01) | |
| G08C 15/00 | (2006.01) | |
| H04L 12/66 | (2006.01) | |
| H04W 36/18 | (2009.01) | |
| H04W 76/12 | (2018.01) | |
| H04W 76/38 | (2018.01) | |
| H04W 76/25 | (2018.01) | |

(52) U.S. Cl.
CPC ........ *H04W 36/0011* (2013.01); *H04W 36/18* (2013.01); *H04W 76/12* (2018.02); *H04W 76/38* (2018.02); *H04W 36/00* (2013.01); *H04W 76/25* (2018.02)

(58) Field of Classification Search
CPC ........... H04W 76/045; H04W 36/0011; H04W 36/18; H04W 76/25; H04W 76/30; H04W 76/10; H04W 76/12; H04W 76/38; H04W 36/00
USPC ........................................................ 455/442
See application file for complete search history.

(56) References Cited

U.S. PATENT DOCUMENTS 6,510,153 B1 * 1/2003 Inoue ................ H04L 29/12216
                                                              370/313
2010/0195503 A1 * 8/2010 Raleigh ............... H04L 41/0806
                                                              370/235

FOREIGN PATENT DOCUMENTS

WO   2013/072403 A1   5/2013

OTHER PUBLICATIONS

Motorola Motility, Lenovo, "Considerations for IP Session Continuity", SA WG2 Meeting #113AH S2-161020. Feb. 23-26, 2016, 5 pages.
E. Grinshpun et al, "Intelligent Connection Manage for Seamless Interworking of Multi-Technology Mobile Devices", Bell Labs Technical Journal, 2011, pp. 5-22.
J. Charles et al., "P-Hevor—System Requirements and Architecture", NGMN Alliance, Feb. 11, 2013, 20 pages.

(Continued)

*Primary Examiner* — German Viana Di Prisco
*Assistant Examiner* — Mark G. Pannell
(74) *Attorney, Agent, or Firm* — Kunzler Bean & Adamson

(57) ABSTRACT

Apparatuses, methods, and systems are disclosed for providing data connectivity with various types of data session continuity. One apparatus 200 includes a processor 205 that receives a data session request, identifies a required continuity type based on the data session request, and establishes a PDU session having the required continuity type. The required continuity type may be selected from a plurality of continuity type supported by a mobile communication network 312. In various embodiments, the apparatus 200 includes a transceiver 225 that communicates with the mobile communication network 312.

30 Claims, 9 Drawing Sheets

(56) References Cited

OTHER PUBLICATIONS

Motorola Mibility, "Preferred Realm / OUI in ANDSF Policies", SA WG2 Meeting #86 S2-113380, Jul. 11-15, 2011, 6 pages.

Motorola Motility, Lenovo, "Solution" PDU Sessions with Different Continuity Types, SA WG2 Meeting #114 S2-161573, Apr. 11-15, 2016, 4 pages.

Cisci Systems, Inc. et al., System Enables for Session and Service Continuity', SA WG2 Meeting #114 S2-161979, Apr. 11-15, 2016, 5 pages.

PCT/US2017/025989. Notification of Transmittal of the International Search Report and the Written Opinion of the International Searching Authority, or the Declaration, Patent Cooperation Treaty, Jun. 20, 2017, 18 pages.

* cited by examiner

| | 810 | 815 | 820 | 825 | |
|---|---|---|---|---|---|
| | 1 | App. ID | com.skype.raider | session-continuity | |
| | 2 | App. ID | com.android.chrome | no-continuity | |
| | 3 | App. ID | com.live.camera.server | address-preservation | 805 |
| | 4 | Dest. Address | 10.10.0.0/16 | session-continuity | |
| | 5 | Protocol/Port | TCP   port:80 | no-continuity | |
| | ⋮ | ⋮ | ⋮  Default Rule | ⋮ | |
| | 999 | Any | Any | no-continuity | |

PDU SESSIONS WITH VARIOUS TYPES OF SESSION CONTINUITY

FIELD

The subject matter disclosed herein relates generally to wireless communications and more particularly relates to providing data connectivity with various types of data session continuity.

BACKGROUND

The following abbreviations are herewith defined, at least some of which are referred to within the following description.

3GPP Third Generation Partnership Project
AG Access Gateway
ANDSF Access Network Discovery and Selection Function
AP Access Point
BG Border Gateway
DL Downlink
DNS Domain Name System
eNB Evolved Node B
EPC Evolved Packet Core
ETSI European Telecommunications Standards Institute
FTP File Transfer Protocol
FQDN Fully Qualified Domain Name
H-PLMN Home Public Land Mobile Network
IP Internet Protocol
IoT Internet of Things
ISP Internet Service Provider
LAN Local Area Network
LTE Long Term Evolution
MPTCP MultiPath Transport Control Protocol
MME Mobility Management Entity
MMS Multimedia Messaging Service
OFDM Orthogonal Frequency Division Multiplexing
PDN Packet Data Network
PDU Protocol Data Unit
PGW Packet Data Network Gateway
PLMN Public Land Mobile Network
RAN Radio Access Network
SC-FDMA Single Carrier Frequency Division Multiple Access
SGW Serving Gateway
SIP Session Initiation Protocol
SMS Short Messaging Service
TCP Transmission Control Protocol
UDP User Datagram Protocol
UE User Entity/Equipment (Mobile Terminal)
UL Uplink
URI Uniform Resource Identifier
V-PLMN Visited Public Land Mobile Network
VoIP Voice over Internet Protocol
WAN Wide Area Network
WiMAX Worldwide Interoperability for Microwave Access In wireless communications networks, all data connections (e.g., PDN connections) supported in 3GPP mobile networks support only continuity with IP-address preservation, wherein the IP address is maintained for an extended period of time. In other words, every PDN connection in the 3GPP network maintains its IP (or IP addresses, in case both IPv4 and IPv6 addresses are assigned) for the entire duration of this PDN connection. This requires a fixed mobility anchor at the PGW for every PDN connection.

To maintain the fixed mobility anchor as a UE moves from one location to another, significant mobility management signaling is required and the network. For example, when the UE moves to a new eNB, not only the S1u bearer of the PDN connection is relocated but also the S5/S8 bearer of the PDN connection may be relocated should the UE moves to an area served by a new SGW.

Bearer relocations (required to maintain the same fixed anchor for the PDN connection) increase the signaling load and the network, especially when UEs are highly mobile and their population is large. As the UE population in a mobile network increases, the signaling load becomes unmanageable.

BRIEF SUMMARY

Apparatuses for providing data connectivity with various types of data session continuity are disclosed. Methods and systems also perform the functions of the apparatus. In one embodiment, the apparatus includes a processor that receives a data session request, identifies a required continuity type based on the data session request, and establishes a PDU session having the required continuity type. The required continuity type may be selected from a plurality of continuity types supported by a mobile communication network. The apparatus may further include a transceiver that communicates with the mobile communication network.

In some embodiments, the apparatus further includes a storage device having a continuity selection policy. The continuity selection policy may include one or more prioritized rules for selecting a required continuity type based on one or more data session characteristics. The processor may apply the continuity selection policy to a data session to identify the required continuity type. In one embodiment, the continuity selection policy is provisioned by the mobile communication network, wherein the mobile communication network is a visited mobile communication network and/or a home mobile communication network.

In some embodiments, the processor requests an initial PDU session having a default continuity type. The apparatus may include a storage device having a continuity selection policy, wherein the processor searches the continuity selection policy for the default continuity type. The continuity selection policy may include one or more prioritized rules for selecting a required continuity type based on data session characteristics. In certain embodiments, the processor requests an initial PDU session without indicating a default continuity type. In such embodiments, the processor may receive, from the mobile communication network, a default continuity type determined based on a network policy of the mobile communication network.

In certain embodiments, the processor detects a termination of the data session and determines whether the PDU session becomes inactive for at least a threshold inactivity period, wherein a PDU session becomes inactive in response to no open data sessions requiring the continuity type corresponding to that PDU session. In such embodiments, the processor terminates the PDU session in response to the PDU session being inactive for at least a threshold inactivity period.

The apparatus may include a storage device having a continuity selection policy stored thereon, the continuity selection policy indicating the threshold inactivity period. In one embodiment, the processor receives the threshold inactivity period from the mobile communication network in response to establishing the PDU session having the required continuity type. In other embodiments, the processor further receives an indication from the mobile communication network that the PDU session is terminated, wherein the mobile communication network terminates the PDU session in response to the PDU session being inactive for at least a threshold inactivity period. The length of the threshold inactivity period may be based on a continuity type of the PDU session.

In some embodiments, the processor receives a second data session request and identifies a second required continuity type based on the data session request. The processor routes the second data session through an established PDU session in response to the second required continuity type matching the continuity type of the established PDU session. The processor also requests a new PDU session having the second required continuity type in response to the second required continuity type not matching the continuity type of the established PDU session.

In one embodiment, the data session request includes a continuity type parameter, wherein the processor identifies the required continuity type using the continuity type parameter. In a further embodiment, the apparatus may include a storage device having a continuity selection policy stored thereon, the continuity selection policy including one or more prioritized rules for selecting a required continuity type based on data session characteristics. In such embodiments, the processor may determine whether the continuity type parameter conflicts with the continuity selection policy and select a replacement continuity type based on the continuity selection policy in response to the continuity type parameter conflicting with the continuity selection policy.

In some embodiments, each PDU session is assigned a continuity type. In certain embodiments, the processor receives the data session request from an application, wherein the processor identifies the required continuity type further based on an identity of the application. In various embodiments, the required continuity type may be selected from the group consisting of: address preservation, session continuity, and no continuity.

A method for providing data connectivity with various types of data session continuity, in one embodiment, includes receiving a data session request, identifying a required continuity type based on the data session request, and establishing a PDU session having the required continuity type between a mobile unit and a mobile communication network.

In some embodiments, the method further includes applying a continuity selection policy to the data session to identify the required continuity type. The continuity selection policy may include one or more prioritized rules for selecting a required continuity type based on one or more data session characteristics. In one embodiment, the continuity selection policy is provisioned by the mobile communication network, wherein the mobile communication network is a visited mobile communication network and/or a home mobile communication network.

In some embodiments, the method includes requesting an initial PDU session having a default continuity type. In one embodiment, the default continuity type is indicated by a continuity selection policy, the continuity selection policy stored on a storage device and including one or more prioritized rules for selecting a required continuity type based on data session characteristics. In certain embodiments, the method includes requesting an initial PDU session without indicating a default continuity type. In such embodiments, the method includes receiving, from the mobile communication network, a default continuity type determined based on a network policy of the mobile communication network.

In certain embodiments, the method includes detecting a termination of the data session and determining whether the PDU session becomes inactive for at least a threshold inactivity period. A PDU session becomes inactive in response to no open data sessions requiring the continuity type corresponding to that PDU session. In such embodiments, the method includes terminating the PDU session in response to the PDU session being inactive for at least a threshold inactivity period.

In one embodiment, the threshold inactivity period is indicated by continuity selection policy stored on a storage device. In a further embodiment, the method includes receiving the threshold inactivity period from the mobile communication network in response to establishing the PDU session having the required continuity type. In other embodiments, the method may include receiving an indication from the mobile communication network that the PDU session is terminated, wherein the mobile communication network terminates the PDU session in response to the PDU session being inactive for at least a threshold inactivity period. The length of the threshold inactivity period may be based on a continuity type of the PDU session.

In some embodiments, the method includes receiving a second data session request and identifying a second required continuity type based on the data session request. The method includes the routing the second data session through an established PDU session in response to the second required continuity type matching the continuity type of the established PDU session and requesting a new PDU session having the second required continuity type in response to the second required continuity type not matching the continuity type of the established PDU session.

In one embodiment, the data session request includes a continuity type parameter, wherein the processor identifies the required continuity type using the continuity type parameter. In a further embodiment, the method may include determining whether the continuity type parameter conflicts with a continuity selection policy and selecting a replacement continuity type based on the continuity selection policy in response to the continuity type parameter conflicting with the continuity selection policy. In such embodiments, the continuity selection policy stored on a storage device and comprising one or more prioritized rules for selecting a required continuity type based on data session characteristics.

In some embodiments, each PDU session is assigned a continuity type. In certain embodiments, the method includes receiving the data session request from an application, wherein identifying the required continuity type includes identifying the required continuity type further based on an identity of the application. In various embodiments, the required continuity type may be selected from the group consisting of: address preservation, session continuity, and no continuity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a block diagram illustrating one embodiment of a continuity selection policy.

DETAILED DESCRIPTION

Figure 1:
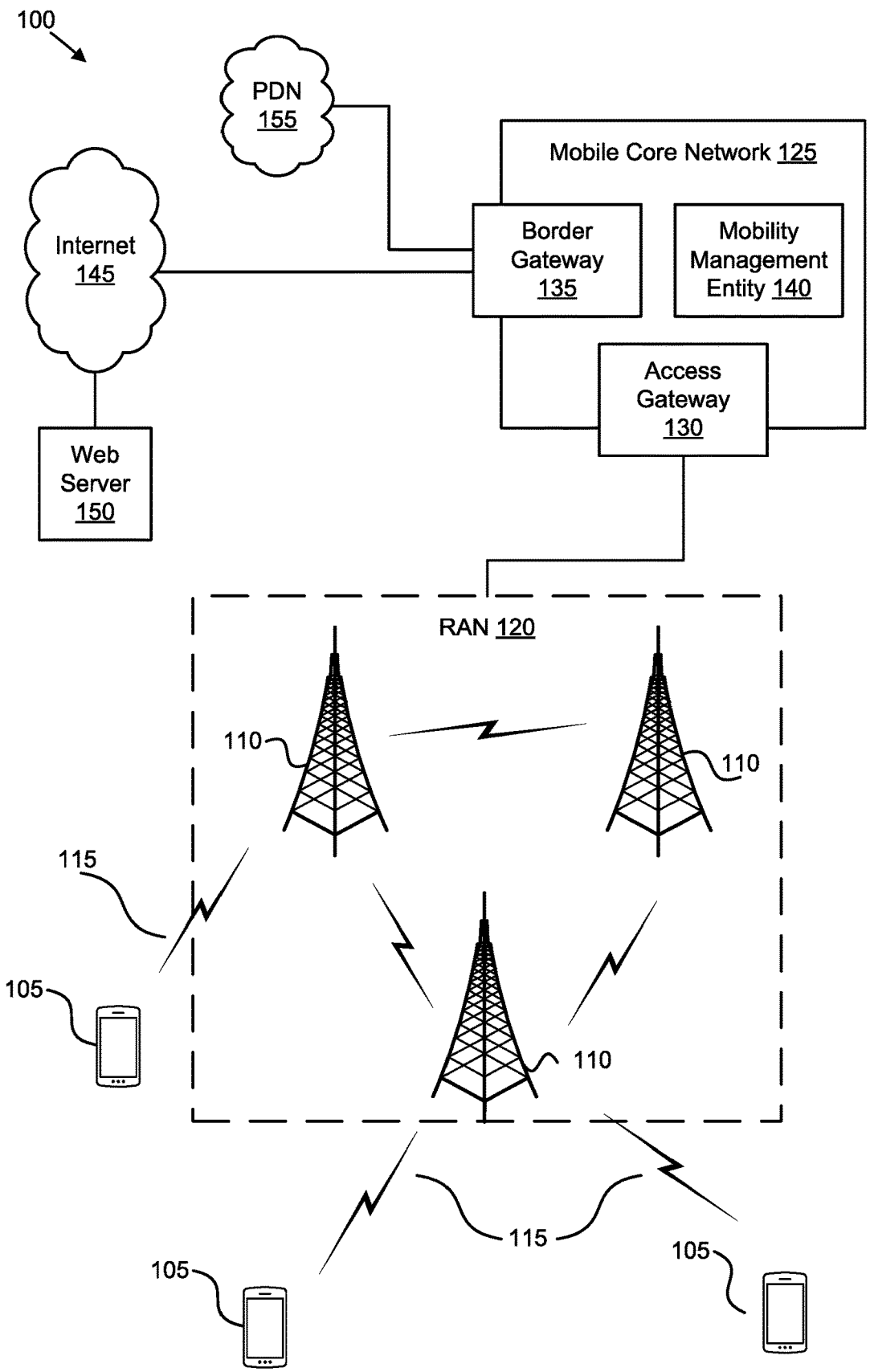
FIG. 1 is a schematic block diagram illustrating one embodiment of a wireless communication system for providing data connectivity with various types of continuity.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider ("ISP")).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Fifth-generation ("5G") mobile communication networks are expected to support an increased number of users and user mobility is expected to be high. Current networks use a fixed anchor for a user equipment ("UE") data connection. Bearer relocations for fixed-anchor data connections have high signaling overhead. In order to alleviate the expected high mobility management signaling in 5G networks, the disclosed embodiments implement data sessions having one of a plurality of continuity types. Further, a UE may select a particular continuity type when establishing a data session based on the continuity requirements of a requested session.

For instance, many modern applications are designed to conceal an IP-address-change event from the user. As an example, when a video streaming application detects an IP-address-change event, it will automatically reestablish the IP streaming session and resume fetching data from the server. So long as the connectivity interruption caused by the IP-address-change event does not take too long, the video streaming application's buffer will not run out of data and the streaming session, as perceived by the user, will continue uninterrupted. In this example, the application is able to filter out the short interruptions caused by the IP-address-change events. Thus, applications that can conceal an IP-address-change event do not require a high level of continuity (i.e. IP-address preservation).

The disclosed embodiments discuss three types of data session continuity: an address-preservation type, a session-continuity type, and a no-continuity type. Here, the address-preservation type is the highest level of data session continuity, followed by session-continuity type and no-continuity type. When requesting the data session, a UE requests the lowest level of data session continuity required. For example, a UE only requests a data session with the address-preservation type of continuity if an application executing on the UE requires address preservation. Similarly, a UE may only request a data session with the session-continuity type of continuity if an application executing on the UE requires that continuity type.

As used herein, a "data session" refers to a logical context in the UE that enables data communication between a local endpoint in the UE (e.g., a web browser) and a remote endpoint (e.g., a Web server located in a remote host). Generally, a data session in the UE starts when a new network socket is created. A data session may be started by an application executing on the UE. The data session may be terminated by the application, by the remote endpoint, or by the networking stack in the UE. When the data session begins, it is bound to a certain network address (e.g., an IP address), a certain transport protocol (e.g., UDP, TCP), and certain port numbers. The data session supports communication between the two endpoints as long as the bounded network address remains unchanged.

As used herein, "session continuity" refers to the ability to maintain an ongoing data session by utilizing the same network address for the entire duration of the data session. However, between subsequent data sessions the UE may change network addresses. Generally, providing data session continuity does not require the UE to maintain the same network address for an extended period of time. A local mobility anchor may be provided to support session continuity. In contrast, with no continuity, UE mobility causes interruptions to the data session whenever the mobility results in a change of network (e.g., IP) address.

As used herein, "address preservation" refers to the ability to maintain the same a network address for an extended period of time. Address preservation may be required by applications executing on the UE that serve incoming connections, such as a video streaming server or a Web server in the UE. The network address may be published to a registry and/or maybe associated with a long-term identity, such as FQDN or SIP URI. As will be apparent, address preservation capability also enables session continuity, as discussed above. However, address preservation is more resource intensive than session continuity and requires more mobility management signaling. Accordingly, the UE does not establish a data session with address-preservation type continuity for applications that do not require address preservation.

For a UE having data session of the no-continuity type, the UE may change IP addresses in the middle of an ongoing IP data session due to the UE mobility. When this occurs, the IP data session is abruptly terminated, creating an interruption. An application associated with the terminated IP data session may then establish a new IP data session to continue communication with the remote endpoint. As discussed above, the interruption may be tolerable by the application. Examples of applications on a UE which tolerate these data session interruptions include, but are not limited to, a streaming client, a DNS client, an FTP client, an email client, an IoT application, and any application using its own mobility protocol (e.g., SIP, MPTCP, and the like).

For a UE having a data session of the session-continuity type, the UE may change IP addresses in the middle of an ongoing IP data session due to the UE mobility, but the IP address used at the beginning of the IP data session remains usable for the entire duration of the session. Hence, IP data sessions are not terminated due to an IP address change. With session-continuity type data sessions, the mobile communication network uses mobility management procedures to sustain the initial network (e.g., IP) address until all data (e.g., IP) sessions that use this address are terminated. Such procedures may require a local mobility anchor, as discussed in further detail below with reference to FIG. 6. Once all data sessions using the initial address are terminated, the initial network address is released. When establishing a subsequent data session of the session-continuity type, the UE uses another network address. Examples of applications on a UE that require a data session of the session-continuity type include, but are not limited to, voice over IP ("VoIP") and other real-time applications.

For a UE having a data session of the address-preservation type, the UE is assigned a network address (e.g., an IP address) which is preserved for an extended period of time. The assigned IP address may be published to a registry, such as with dynamic DNS. This type of continuity requires a fixed mobility anchor as the UE moves from one location to another. When the UE moves to a new eNB, bearer relocation is required to maintain the network address. As discussed above, all data connections supported in current 3GPP mobile networks use this type of continuity. In order to reduce mobility management overhead in future mobile networks, the mobile network may support a plurality of continuity types and the UE specifies a type of continuity when requesting a new PDU session with the mobile network.

FIG. 1 depicts an embodiment of a wireless communication system 100 for providing data connectivity with various types of continuity. In one embodiment, the wireless communication system 100 includes remote units 105, base units 110, and communication links 115. Even though a specific number of remote units 105, base units 110, and wireless communication links 115 are depicted in FIG. 1, one of skill in the art will recognize that any number of remote units 105, base units 110, and wireless communication links 115 may be included in the wireless communication system 100.

In one embodiment, the remote units 105 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") communication signals. Furthermore, the UL communication signals may be carried over the wireless communication links 115.

The base units 110 may be distributed over a geographic region. In certain embodiments, a base unit 110 may also be referred to as an access point ("AP"), an access terminal, a base, a base station, a Node-B, an eNB, a Home Node-B, a relay node, a device, or by any other terminology used in the art. The base units 110 are generally part of a radio access network ("RAN") 120 that may include one or more controllers communicably coupled to one or more corresponding base units 110. These and other elements of radio access network are not illustrated but are well known generally by those having ordinary skill in the art.

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 may communicate with one or more of the remote units 105 and/or one or more of the base units 110.

The RAN 120 is generally communicably coupled to a mobile core network 125, such as a 5G packet core or the evolved packet core ("EPC") specified in LTE specifications, which may be coupled to other networks, like the Internet and primate data networks, among other data networks. The present disclosure is not intended to be limited to the implementation of any particular wireless communication system architecture or protocol. Thus, in a non-LTE implementation, the RAN 120 may be coupled to a non-EPC type of packet core network, such as to a "5G" packet core network.

The mobile core network 125 belongs to a single public land mobile network ("PLMN"). In certain embodiments, the mobile core network may include one or more network slices that are optimized for a particular traffic type. The depicted mobile core network 125 includes at least one access gateway ("AG") 130 communicatively coupled to the RAN 120 and at least one border gateway ("BG") 135 providing access to the internet 145, a web server 150, and another packet data network ("PDN") 155. The mobile core network 125 further includes at least one mobility management entity ("MME") 140 for tracking the mobile units 105. Even though a specific number of AGs 130, BGs 135, and MMEs 140 are depicted in FIG. 1, one of skill in the art will recognize that any number of AGs 130, BGs 135, and MMEs 140 may be included in the mobile core network 125.

In one implementation, the wireless communication system 100 is compliant with the long-term evolution ("LTE") of the 3GPP protocol, wherein the base unit 110 transmits using an orthogonal frequency division multiplexing ("OFDM") modulation scheme on the DL and the remote units 105 transmit on the UL using a single-carrier frequency division multiple access ("SC-FDMA") scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

In certain embodiments, an apparatus (e.g., UE, remote unit 105) may receive a data session request and identify required continuity type based on the data session request. The required continuity type may be one of a plurality of continuity types supported by the mobile core network. The remote unit 105 may then establish a PDU session having the required continuity type. The mobile core network 125 may in turn apply different levels of mobility management based on the required continuity type. In one embodiment, the mobile core network 125 provides address-preservation and a global mobility anchor (e.g. a Border Gateway 135) for a PDU session of a remote unit 105 in response to the remote unit 105 requiring an "address-preservation" continuity type. In another embodiment, the mobile core network 125 provides session continuity and a local mobility anchor (e.g. an Access Gateway 130) for a PDU session of the remote unit 105, in response to the remote unit 105 requiring a "session-continuity" continuity type. In a further embodiment, the mobile core network 125 may provide no IP session continuity in response to the remote unit 105 requiring a "no-continuity" continuity type.

Figure 2:
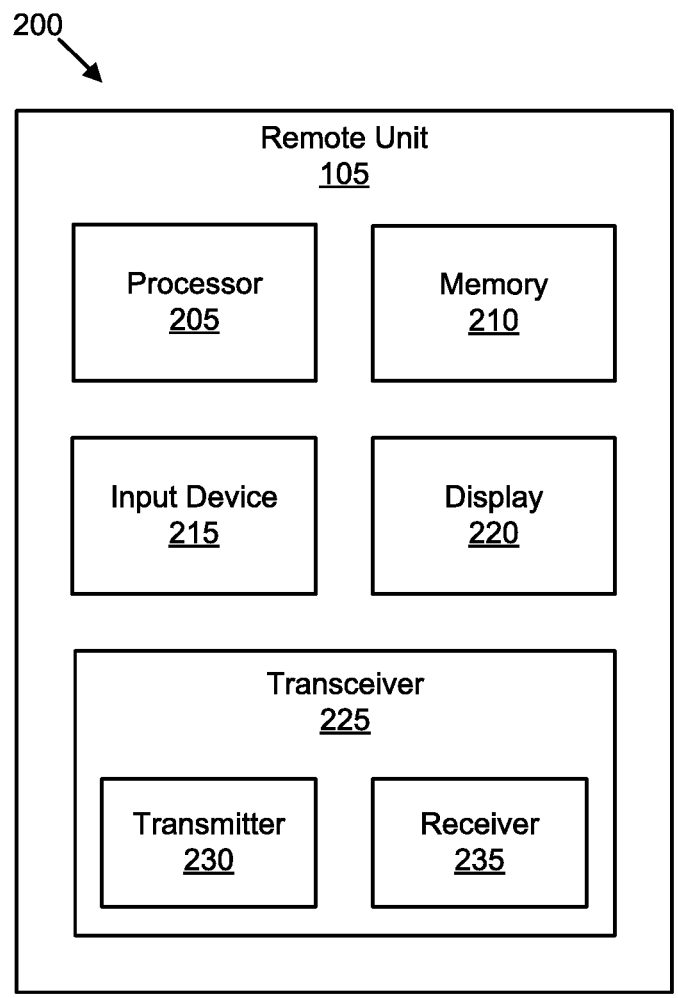
FIG. 2 is a schematic block diagram illustrating one embodiment of an apparatus that may be used for providing data connectivity with various types of continuity.

FIG. 2 depicts one embodiment of an apparatus 200 that may be used for providing data connectivity with various types of continuity. The apparatus 200 includes one embodiment of the remote unit 105. Furthermore, the remote unit 105 may include a processor 205, a memory 210, an input device 215, a display 220, and a radio transceiver 225. In some embodiments, the input device 215 and the display 220 are combined into a single device, such as a touchscreen. In certain embodiments, the remote unit 105 may not include any input device 215 and/or display 220. In various embodiments, the remote unit 105 may include one or more of the processor 205, the memory 210, and the radio transceiver 225, and may not include the input device 215 and/or the display 220.

The processor 205, in one embodiment, may include any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 205 executes instructions stored in the memory 210 to perform the methods and routines described herein. The processor 205 is communicatively coupled to the memory 210, the input device 215, the display 220, and the radio transceiver 225.

In certain embodiments, the processor 205 may identify a required continuity type associated with a received data session request (e.g., received from an application executing on the processor 205) and control the radio transceiver 225 to establish a PDU session having the required continuity type. The required continuity type may be selected from a plurality of continuity types supported by a mobile communication network with the remote unit 105. In one embodiment, the data session may be an IP session. In another embodiment, the data session may be a SMS or MMS session. In certain embodiments, the PDU session is a PDN connection.

In some embodiments, the processor 205 accesses a continuity selection policy stored in the memory 210. As used herein, a continuity selection policy refers to a set of one or more prioritized rules for selecting a required continuity type category, for example based on the identity of the requesting application or based on characteristics of the requested data session (e.g., destination IP address, destination port, transport protocol, and the like). The processor 205 applies the continuity selection policy to the requested data session to identify the required continuity type.

In some embodiments, the continuity selection policy may be provisioned by the mobile communication network, for example by an access network discovery and selection function ("ANDSF") in the mobile core network 125. The processor 205 may receive (via the radio transceiver 225) a continuity selection policy from a home mobile communication network. Additionally, the processor 205 may receive a continuity selection policy from a visited mobile communication network. In certain embodiments, the processor 205 may associate a particular continuity selection policy with a particular mobile communication network. Further, the processor 205 may retrieve a particular continuity selection policy that corresponds to a mobile network in which the remote unit 105 is located.

In one embodiment, upon attaching to a base unit 110, the processor 205 may request an initial PDU session having a default continuity type. In some embodiments, the continuity selection policy includes a default continuity type. In certain embodiments, the default continuity type may be provisioned by the mobile communication network. In other embodiments, the default continuity type may be based on a device type of the remote unit 105.

In another embodiment, the processor 205 may request an initial PDU session without specifying a default continuity type. For example, if the continuity selection policy does not include a default continuity type, then the processor 205 may control the radio transceiver 225 to establish an initial PDU session without requesting a specific default continuity type. Thereafter, the processor 205 may receive the default continuity type from the mobile communication network. The default continuity type provided by the network may be based on network policy. The processor 205 may store the default continuity type, for example in the continuity selection policy and/or in memory 210.

When establishing a PDU session in response to a new data session request, the processor 205 may check to see if a PDU session with the required continuity type has already been established. In such instances, the processor 205 may route a new data session through the existing PDU session (i.e. use for the data session the address assigned to the existing PDU session). Otherwise, the processor 205 will request a new PDU session having a continuity type required by the new data session.

In some embodiments, the processor 205 may monitor network activity over an established PDU session. Additionally, the processor 205 may detect termination of a data session. The processor 205 may determine whether the PDU session becomes inactive for at least a threshold inactivity period. The processor 205 may determine the PDU session to be inactive in response to no open data sessions requiring the continuity type supported by the PDU session. Should the PDU session be inactive for at least the threshold inactivity period, the processor 205 may terminate the PDU session. In other embodiments, the processor 205 may receive notice from the mobile communication network that a PDU session is being terminated due to inactivity.

The threshold inactivity period may be stored in the continuity selection policy and/or may be provided to the remote unit 105 by the network when the PDU session is established. In certain embodiments, PDU sessions with different continuity types may have threshold inactivity periods of different lengths. A length of the threshold continuity period may be based on the continuity type, such that PDU sessions requiring higher levels of mobility management correspond to shorter length inactivity periods. For example, a PDU session with a higher level of data session continuity (e.g., requiring higher amounts of mobility management resources) may have a threshold inactivity period with a shorter length than a PDU session with a lower level of data session continuity. In one embodiment, the threshold inactivity period may be infinite in which case the PDU session is never terminated.

In some embodiments, the data session request may include a continuity type parameter. In such embodiments, the processor 205 may identify required continuity type based on the continuity type parameter. In certain embodiments, the processor 205 translates the continuity type parameter into a continuity type supported by the mobile communication network. As discussed above, the required continuity type may be one of an address-preservation type, a session-continuity type, and a no-continuity type.

In certain embodiments, the processor 205 may manage conflicts between a continuity type requested by an application and a rule in the continuity selection policy. For example, the processor 205 may determine whether the continuity type parameter conflicts with the continuity selection policy and select a replacement continuity type based on the continuity selection policy in response to the continuity type parameter conflicting with the continuity selection policy. In some embodiments, the processor 205 may establish the PDU session using the requested continuity type over a type indicated in the policy, for example, where the application requests a lower level of continuity (e.g., a continuity type requiring fewer resources for mobility management).

The memory 210, in one embodiment, is a computer readable storage medium. In some embodiments, the memory 210 includes volatile computer storage media. For example, the memory 210 may include a RAM, including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media. In some embodiments, the memory 210 stores data relating to a category selection policy. In some embodiments, the memory 210 also stores program code and related data, such as an operating system or other controller algorithms operating on the remote unit 105.

The input device 215, in one embodiment, may include any known computer input device including a touch panel, a button, a keyboard, a stylus, a microphone, or the like. In some embodiments, the input device 215 may be integrated with the display 220, for example, as a touchscreen or similar touch-sensitive display. In some embodiments, the input device 215 includes a touchscreen such that text may be input using a virtual keyboard displayed on the touchscreen and/or by handwriting on the touchscreen. In some embodiments, the input device 215 includes two or more different devices, such as a keyboard and a touch panel.

The display 220, in one embodiment, may include any known electronically controllable display or display device. The display 220 may be designed to output visual, audible, and/or haptic signals. In some embodiments, the display 220 includes an electronic display capable of outputting visual data to a user. For example, the display 220 may include, but is not limited to, an LCD display, an LED display, an OLED display, a projector, or similar display device capable of outputting images, text, or the like to a user. As another, non-limiting, example, the display 220 may include a wearable display such as a smart watch, smart glasses, a heads-up display, or the like. Further, the display 220 may be a component of a smart phone, a personal digital assistant, a television, a table computer, a notebook (laptop) computer, a personal computer, a vehicle dashboard, or the like.

In certain embodiments, the display 220 includes one or more speakers for producing sound. For example, the display 220 may produce an audible alert or notification (e.g., a beep or chime). In some embodiments, the display 220 includes one or more haptic devices for producing vibrations, motion, or other haptic feedback. In some embodiments, all or portions of the display 220 may be integrated with the input device 215. For example, the input device 215 and display 220 may form a touchscreen or similar touch-sensitive display. In other embodiments, the display 220 may be located near the input device 215.

The radio transceiver 225 communicates with the mobile communication network. The mobile communication network supports a plurality of data session connectivity types. In some embodiments, the mobile communication network comprises the base units 110 and a core network 125 discussed above with reference to FIG. 1. The radio transceiver 225 comprises a transmitter 230 used to provide UL communication signals to the base unit 110 and a receiver 235 is used to receive DL communication signals from the base unit 110.

In some embodiments, the radio transceiver 225 is used to establish a data session with the mobile communication network, the data session having a particular connectivity type. For example, the transmitter 230 may establish a PDU session (e.g., establish a PDN connection) with the mobile communication network. The mobile communication network may support a plurality of session continuity types, wherein the transmitter 230 establishes a PDU session having a session continuity type identified by the processor 205 (e.g., based on a received data session request).

Although only one transmitter 230 and one receiver 235 are illustrated, the radio transceiver 225 may include any suitable number of transmitters 230 and receivers 235. The transmitter 230 and the receiver 235 may be any suitable type of transmitters and receivers. For example, in some embodiments, the radio transceiver 225 includes a plurality of transmitter 230 and receiver 235 pairs for communicating on a plurality of wireless networks and/or radio frequency bands, each transmitter 230 and receiver 235 pair configured to communicate on a different wireless network and/or radio frequency band than the other transmitter 230 and receiver 235 pairs.

Figure 3:
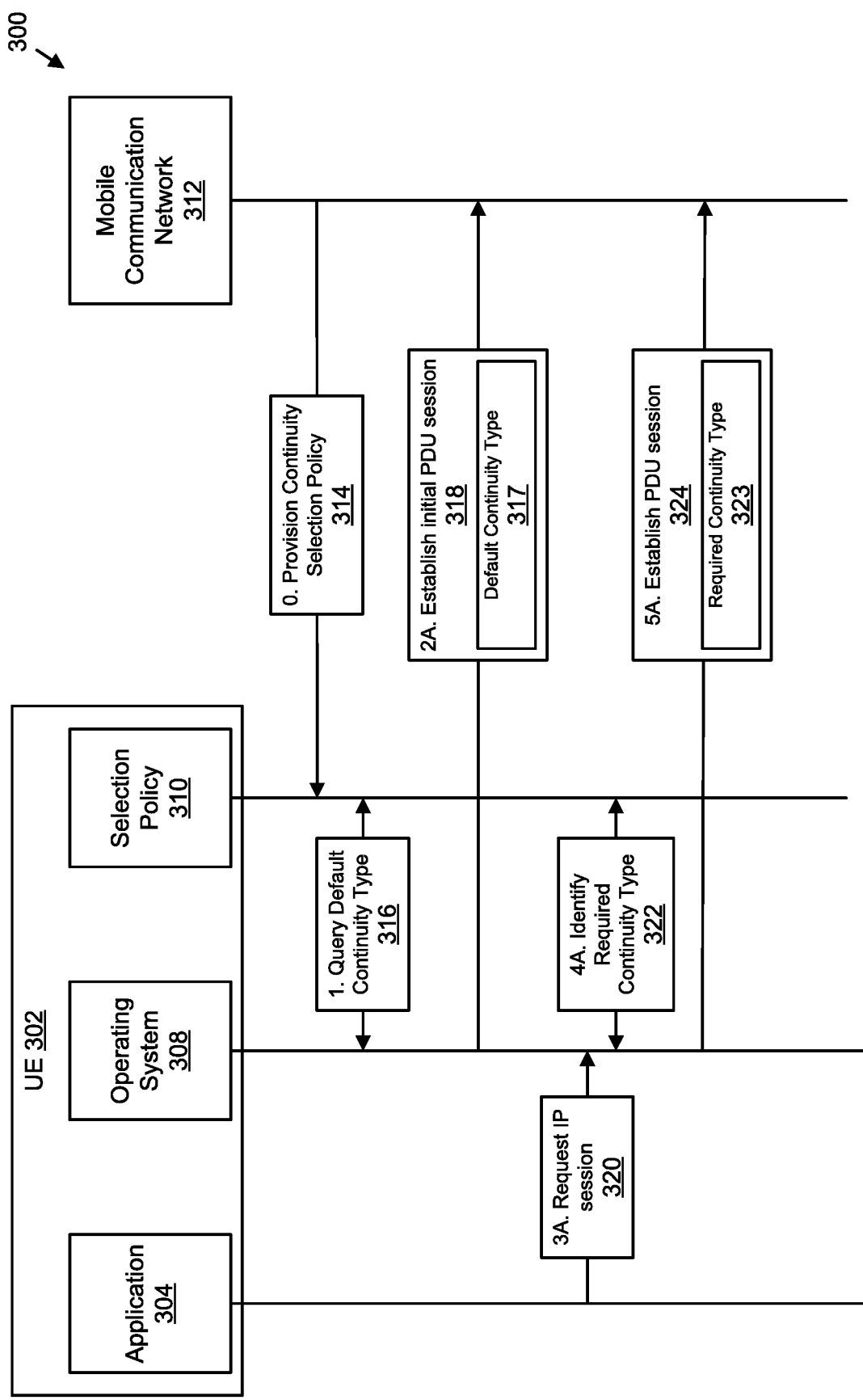
FIG. 3 illustrates one embodiment of a PDU session establishment procedure used for providing data connectivity with various types of continuity.

FIG. 3 illustrates a PDU session establishment procedure 300 used for providing data connectivity with various types of continuity, according to embodiments of the disclosure. In the illustrated embodiment, communication with a UE 302 and mobile communication network 312 are depicted. In certain embodiments, the UE 302 may be one embodiment of the remote unit 105. In some embodiments, the mobile communication network 312 may be one embodiment of the core network 125. Moreover, communication between an application 304 running on the UE 302 and an operating system ("OS") 308 running on the UE 302 are illustrated. In various embodiments, the OS 308 may comprise a networking stack, a connectivity manager, or other controller algorithm according to the UE implementation. The UE 302 also includes a continuity selection policy 310. Although the depicted embodiment portrays the continuity selection policy 310 as a separate element, in other embodiments the continuity selection policy 310 may be an element of the OS 308.

The PDU session establishment procedure 300 begins with the mobile communication network 312 provisioning 314 the UE 302 with a continuity selection policy (e.g., the continuity selection policy 310). In certain embodiments, the provisioning of the continuity selection policy 310 is performed by a network element of the core network 125, such as an ANDSF or other device management element. In one embodiment, the mobile communication network 312 is a home PLMN. In another embodiment, the mobile communication network 312 is a visited PLMN. When the UE 302 enters a service area of the mobile communication network 312, it requests an initial PDU session either during or after the initial attach, for example to the MME 140. In one embodiment, the initial PDU session is an initial PDN connection.

Here, the OS 308 queries 316 the selection policy 310 to identify a default continuity type. However, in other embodiments the UE 302 may store the default continuity type in another location. Thereafter, the OS 308 establishes the initial PDU session 318 using the default continuity type. In some embodiments, the OS 308 passes a default continuity type parameter 317 when establishing the initial PDU session 318. In certain embodiments, the UE 302 is not provisioned with a default session continuity type. Such embodiments are discussed below with reference to FIG. 4. The UE 302 requests a PDU session with the default continuity type only when the UE needs to establish the PDU session prior to an application requesting a data session, as shown in FIG. 3.

At some point, the application 304 requests a data session. For example, the application 304 may start a new IP session by sending a new IP session request 320 to the OS 308. Thereafter, the UE 302 identifies 322 the type of continuity required by the requested data session (e.g., IP session). In the depicted embodiment, the application 304 does not specify the required type of continuity. Rather, the OS 308 determines the required continuity type by using the provisioned continuity selection policy 310.

The continuity selection policy 310 contains a list of prioritized rules, each rule indicating a required continuity type for all data sessions that match the rule. The OS 308 searches through the continuity selection policy 310, starting with the highest priority rule, until either a match is found (e.g., based on characteristics of the data session request) or all rules have been examined without finding a match. In some embodiments, the continuity selection policy 310 may include a catch-all rule (a lowest priority rule) applicable to any data session that does not match any other rule. In certain embodiments, the catch-all rule indicates the default continuity type 317 discussed above. In other embodiments, the continuity type indicated by the catch-all rule may differ from the default continuity type 317 used to establish an initial PDU session.

Each rule in the continuity selection policy 310 may include a priority (e.g., first, second, third, etc.), a rule characteristic having a type and value (e.g., to be compared to a corresponding characteristic of the requested data session), and a required continuity type. The rule characteristic type is a category of characteristic found in the data session request. Examples of rule characteristic types include, but are not limited to, an identity of the application 304 requesting the data session, a destination network (e.g., IP) address, a destination domain name, a requested session transport protocol (e.g., TCP or UDP), and a requested port. A model continuity selection policy is depicted in FIG. 8.

When the new data session starts in the UE 302, the OS 308 determines 322 the type of continuity required and further determines whether the UE 302 has already established a PDU session (e.g., already has an active PDN connection) that supports the continuity type 323 required by the new data session (e.g., as determined using the continuity selection policy 310). If a PDU session with the required continuity type 323 already exists, then the UE 302 routes the traffic of the new data session (e.g., new IP session or SMS session) through the already established PDU session (e.g., within the already active PDN connection). Otherwise, if the UE 302 does not already have an established PDU session of the correct continuity type, then the UE 302 (e.g., via the OS 308) requests 324 a new PDU session having the continuity type 323 required by the new data session. For example, the UE 302 may request a new PDN connection that supports a continuity type 323 required by a new IP session.

The UE 302 maintains a PDU session until it has no data session that requires the continuity type supported by the PDU session. In some embodiments, the UE 302 determines whether the PDU session becomes inactive for at least a threshold inactivity period. As used herein, a PDU session becomes inactive when no open data sessions require the continuity type supported by the PDU session. In response to a PDU session being inactive for at least the threshold inactivity period, the UE 302 terminates the PDU session. Alternatively, the PDU session may be terminated by the mobile communication network 312 (e.g. by the MME 140). The threshold inactivity period may be part of the continuity selection policy 310 and/or may be provided to the UE 302 by the network 312 when the PDU session is established 324. In certain embodiments, the length of the threshold inactivity period is based on a continuity type of the PDU session. For example, a PDU session with a continuity type of "no-continuity" may correspond to a threshold inactivity period with a relatively large length, while a PDU session with a continuity type of "session-continuity" may correspond to a threshold inactivity period with a smaller length.

Figure 4:
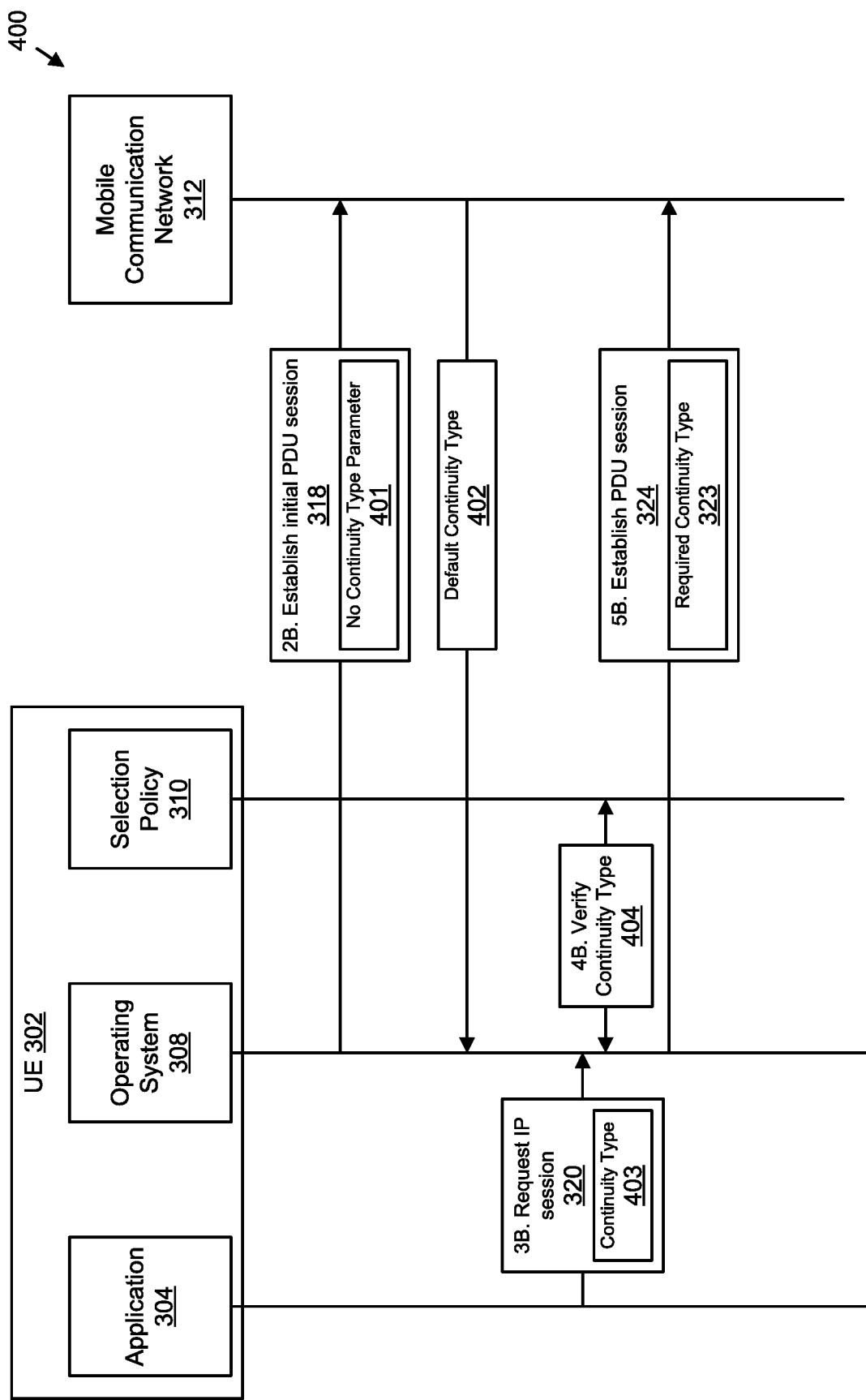
FIG. 4 illustrates another embodiment of a PDU session establishment procedure used for providing data connectivity with various types of continuity.

FIG. 4 illustrates a PDU session establishment procedure 400 used for providing data connectivity with various types of continuity, according to embodiments of the disclosure. The PDU session establishment procedure 400 represents an alternative to the PDU session establishment procedure 400. In the illustrated embodiment, communication with the UE 302 and the mobile communication network 312 are depicted. As in FIG. 3, the UE 302 includes an application 304 and an operating system 308. In the procedure 400, the selection policy 310 is optional, as described below. In certain embodiments, a continuity selection policy 310 is provisioned by the mobile communication network 312. However, in other embodiments the network does not provide the UE 302 with a continuity selection policy 310.

Here, the UE 302 establishes an initial PDU session 318 with the mobile communication network 312. In one embodiment, the UE 302 establishes a PDN connection with the mobile communication network 312. As depicted, when the UE 302 establishes the initial PDU session 318 (i.e. when no application in the UE 302 has requested a data session), it does not provide a continuity type parameter 401. In one embodiment, the UE 302 does not provide a continuity type parameter 401 (e.g., sends a blank parameter) because it does not have a continuity selection policy 310 for the mobile communication network. In another embodiment, the UE 302 did not provide the continuity type parameter 401 because the continuity selection policy 310 does not include a default selection rule.

In response to the UE 302 establishing an initial PDU session 318 without providing a continuity type parameter 401, the mobile communication network 312 determines and provides a default continuity type 402 to the UE 302. In one embodiment, the mobile communication network 312 provisions the UE 302 with a continuity selection policy 310 that includes the default continuity type 402 in response to the UE 302 establishing an initial PDU session 318 without providing a continuity type parameter 431.

At some point in time, the application 304 requests a data session. As depicted, the application 304 may request an IP session by sending a new IP session request 320 to the OS 308. Here, the new IP session request includes a parameter indicating a continuity type 403 requested by the application 304. In certain embodiments, the OS 308 may translate the parameter to a type of continuity supported by the mobile communication network.

In one embodiment, the application 304 that starts the new IP session indicates the type of continuity required by this IP session using a software API extension. For example, the application 304 may request a "nomadic" IP address, a "sustained" IP address, or a "fixed" IP address. The OS 308 may translate a request for a "nomadic" IP addresses as requesting a no-continuity type of continuity. The OS 308 translates a request for a "sustained" IP address as requesting a session-continuity type of continuity. The OS 308 may translate a quote request for a "fixed" IP address as a request for an address-preservation type of continuity.

The OS 308 may then establish a PDU session 324 having a required continuity type 323. In some embodiments, the required continuity type 323 is the continuity type 403 requested by the application 304. In certain embodiments, the OS 308 consults the continuity selection policy 310 to verify 404 the requested continuity type. In one embodiment, the continuity selection policy 310 may override the requested continuity type. For example, an application 304 may request a PDU session having a "session-continuity" type, but the continuity selection policy may instead require a "no-continuity" type of continuity based on characteristics of the requested IP session and/or an identity of the requesting application 304. In this way, an operator of the mobile communication network 312 may override the continuity type requested by some applications 304.

In some embodiments, the requested continuity type 403 may not be supported by the mobile communication network, wherein the OS 308 uses the continuity selection policy 310 to identify an appropriate replacement continuity type. Should a replacement continuity type be needed for should the continuity selection policy 310 identify a different continuity type than requested, the OS 308 establishes a PDU session 324 with the required continuity type 323 identified using the continuity selection policy 310. In certain embodiments, a continuity selection policy may instruct the UE 302 to ignore a request for a specific continuity type 403 and instead rely solely on the continuity selection policy to identify a required continuity type 323, as described above with reference to FIG. 3.

Again, the OS 308 determines whether the UE 302 has already established a PDU session (e.g., already has an active PDN connection) that supports the continuity type 323 required by the new data session. If a PDU session with the required continuity type already exists, then the UE 302 routes the traffic of the new data session through the already established PDU session (e.g., within the already active PDN connection). Otherwise, if the UE 302 does not already have an established PDU session of the correct continuity type, then the UE 302 (e.g., via the OS 308) requests 324 a new PDU session having the continuity type 323 required by the new data session. For example, the UE 302 may request a new PDN connection that supports a continuity type 403 required by a new IP session.

The UE 302 maintains a PDU session until it has no data session that requires the continuity type supported by the PDU session. In some embodiments, the UE 302 determines whether the PDU session becomes inactive for at least a threshold inactivity period. As used herein, a PDU session becomes inactive when no open data sessions require the continuity type supported by the PDU session. In response to a PDU session being inactive for at least the threshold inactivity period, the UE 302 terminates the PDU session. The threshold inactivity period may be part of the continuity selection policy 310 and/or may be provided to the UE 302 by the network when the PDU session is established 324. In certain embodiments, the length of the threshold inactivity period is based on a continuity type of the PDU session. For example, a PDU session with a continuity type of "session-continuity" may correspond to a threshold inactivity period of longer length than a PDU session with a continuity type of "address-preservation."

Figure 5:
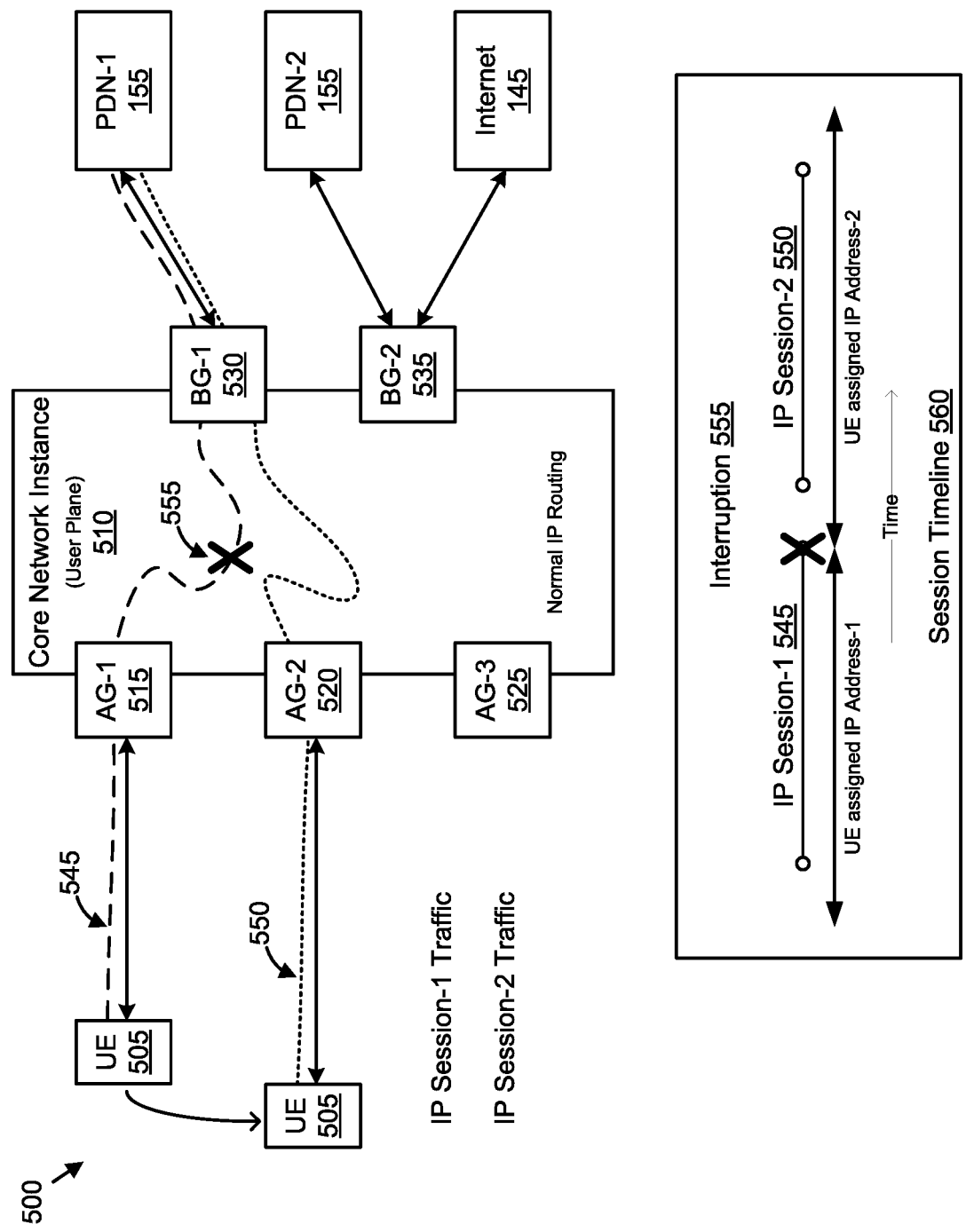
FIG. 5 illustrates one embodiment of a mobile communication network providing data connectivity with a first type of continuity.

FIG. 5 illustrates a mobile communication network 500 providing data connectivity with a first continuity type, according to embodiments of the disclosure. The network 500 includes a UE 505 which connects (e.g., via an eNB, not shown) to a core network instance 510. While FIG. 5 is discussed in terms of IP addresses and IP sessions, the disclosure is not limited to such. Indeed, the principles of FIG. 5 are applicable to other types of network addresses and to other types of data sessions.

In the depicted embodiment, the UE 505 does not require data session continuity and therefore establishes a PDU session of a no-continuity type. Accordingly, the network 500 does not need to maintain a fixed mobility anchor for the PDU session and therefore does not need mobility management signaling to maintain connectivity between the UE 505 and this anchor as the UE 505 moves from one location to another. The no-continuity type of continuity is efficient for fixed UEs and also for mobile UEs with applications that can tolerate communication interruptions, as discussed above. In certain embodiments, the majority of PDU sessions in the system 100 have the no-continuity type of continuity, thereby minimizing mobility management signaling.

The core network instance 510 may be one embodiment of a user plane of the mobile core network 125. The core network instance 510 includes a first AG 515, a second AG 520, and a third AG 525. The core network instance 510 further includes a first BG 530 and a second BG 535. In the depicted embodiment, the first BG 530 is connected to a first PDN 155, while the second BG 535 is connected to both a second PDN 155 and to the Internet 145.

The UE 505 initially attaches to the first AG 515 (a first hop router) and establishes a first IP session 545 with an endpoint in the first PDN 155. As depicted, network traffic of the first IP session 545 is routed in the core network instance 510 between the first AG 515 and the first BG 530. Here, the core network instance 510 uses normal IP routing between the AGs 515-525 and the BGs 530-535. The UE uses an initial IP address during the first IP session 545.

At some point in time, the UE travels to a new location (e.g., to the service area of a new eNB) where no longer attaches to the first AG 515, but instead attaches to the second AG 520. After the UE 505 moves to the new AG (e.g., second AG 520), the UE 505 is assigned a new prefix/IP address. The UE 505 experiences a mobility-induced interruption 555 to the first IP session 545, terminating the first IP session 545. The UE 505 then establishes a second IP session 550 with the endpoint in the first PDN 155. As depicted, network traffic of the second IP session 550 is routed in the core network instance 510 between the second AG 520 and the first BG 530.

FIG. 5 further depicts a session timeline 560 showing the establishment (and termination) of the first IP session 545 and the second IP session 550 over time. As depicted, the UE 505 is assigned a first IP address during the first IP session 545. Due to travel of the UE 505, the first IP session 545 is interrupted 555. Afterwards, the UE 505 is assigned a second IP address (this occurs while the UE 505 is attached to the second AG 520) and establishes the second IP session 550. An interval of time passes between the interruption 555 and establishment of the new (second) IP session 550. However, as discussed above, many applications that run on the UE 505 are designed to filter out IP session interruptions from user perception.

While FIG. 5 is discussed in terms of IP addresses and IP sessions, the disclosure is not limited to such. Indeed, the principles of FIG. 5 are applicable to other types of network addresses and to other types of data sessions.

Figure 6:
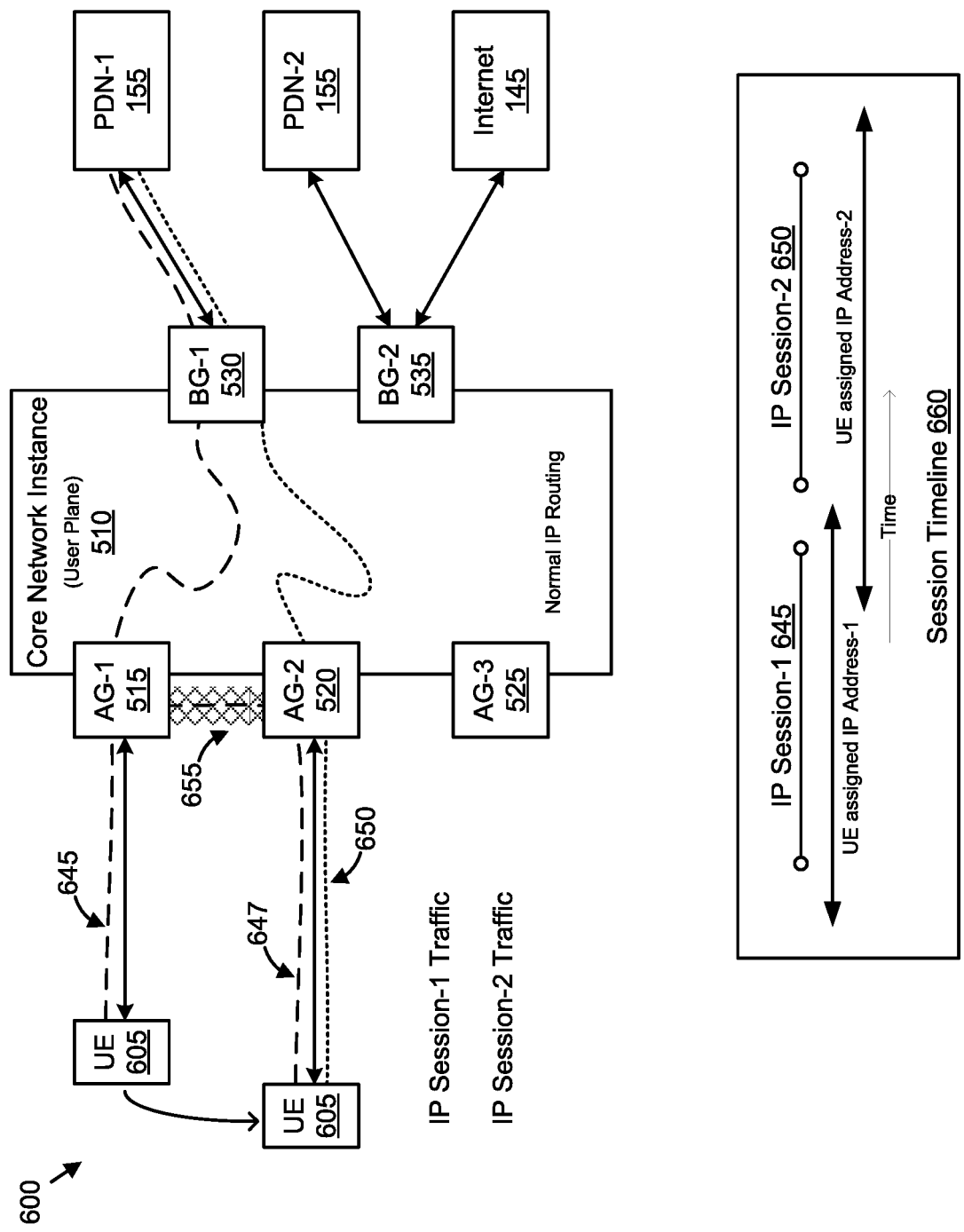
FIG. 6 illustrates one embodiment of a mobile communication network providing data connectivity with a second type of continuity.

FIG. 6 illustrates a mobile communication network 600 providing data connectivity with a second type of continuity, according to embodiments of the disclosure. The network 600 includes a UE 605 which connects (e.g., via an eNB, not shown) to the core network instance 510. While FIG. 6 is discussed in terms of IP addresses and IP sessions, the disclosure is not limited to such. Indeed, the principles of FIG. 6 are applicable to other types of network addresses and to other types of data sessions.

In the depicted embodiment, the UE 605 only requires session continuity but does not require address preservation. Accordingly, the UE 605 establishes a PDU session of a session-continuity type. To support the required continuity type, the network 600 uses a local mobility anchor to sustain an IP address until all IP sessions that use this address are terminated. The network 600 uses mobility management procedures to sustain the IP address via the local mobility anchor. In one example, the type of mobility depicted in FIG. 6 may be used for slower moving UEs 605 utilizing real-time applications, such as voice over IP (VoIP).

The UE 605 initially attaches to the first AG 515 (a first-hop router) and establishes a first IP session 645 with an endpoint in the first PDN 155. As depicted, network traffic of the first IP session 645 is routed in the core network instance 510 between the first AG 515 and the first BG 530. Here, the core network instance 510 uses normal IP routing between the AGs 515-525 and the BGs 530-535. The UE uses an initial (e.g., first) IP address during the first IP session 645.

At some point in time, the UE travels to a new location (e.g., to the service area of a new eNB) where no longer attaches to the first AG 515, but instead attaches to the second AG 520. After the UE 605 moves to the new AG (e.g., second AG 520), the UE 605 is assigned a new prefix/IP address. However, with the session-continuity type connection, the network 600 also maintains the initial IP address for supporting ongoing IP sessions that require the session-continuity type.

The network 600 maintains the initial IP address by establishing a tunnel 655 between the first AG 515 and the second AG 520 thus enabling traffic forwarding. The tunnel 655 is released once all sessions using the initial IP address are terminated. A new IP session started while the UE 605 is attached the second AG 520 uses a second IP address. FIG. 6 depicts a second IP session 650 established after the UE 605 travel to the new AG (e.g., second AG 520). As depicted, network traffic of the second IP session 650 is routed in the core network instance 510 between the second AG 520 and the first BG 530.

FIG. 6 further depicts a session timeline 660 showing the establishment (and termination) of the first IP session 645 and the second IP session 650 over time. As depicted, the UE 605 is assigned a first IP address during the first IP session 645. Due to travel, the UE 605 is assigned a second IP address. Afterwards, the UE 605 establishes the second IP session 650. As depicted, there is a period of overlap during which the UE 605 is assigned to different IP addresses.

Figure 7:
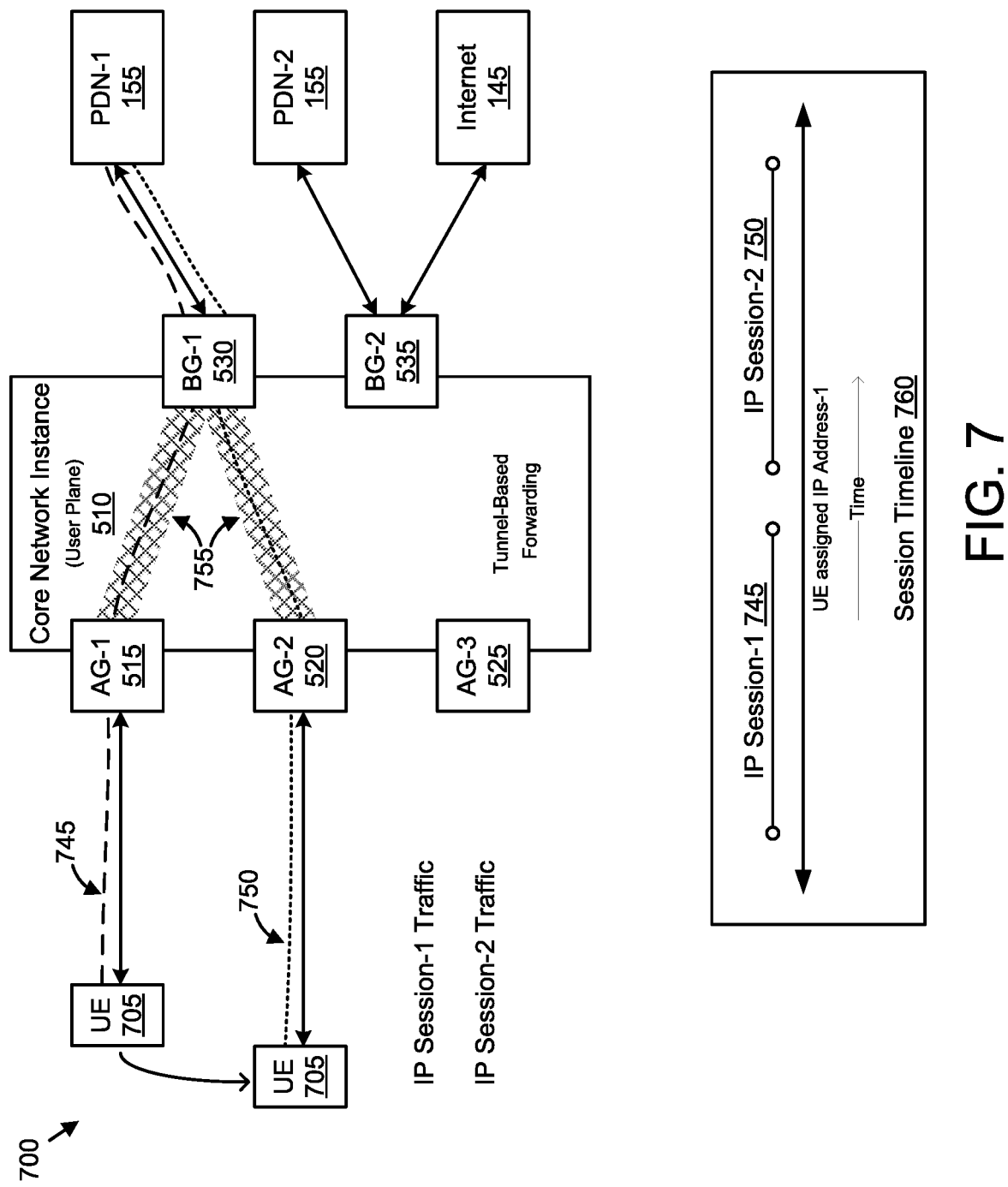
FIG. 7 illustrates one embodiment of a mobile communication network providing data connectivity with a third type of continuity.

FIG. 7 illustrates a mobile communication network 700 providing data connectivity with a third type of continuity, according to embodiments of the disclosure. The network 700 includes a UE 705 which connects (e.g., via an eNB, not shown) to the core network instance 510. While FIG. 7 is discussed in terms of IP addresses and IP sessions, the disclosure is not limited to such. Indeed, the principles of FIG. 7 are applicable to other types of network addresses and to other types of data sessions.

In the depicted embodiment, the UE 705 requires address preservation. Accordingly, the UE 705 establishes a PDU session having an address-preservation type of continuity. To support the required continuity type, the network 700 uses extended mobility management procedures that preserve an IP address for an extended period of time (e.g., for as long as a PDN connection remains active). Such procedures require a global mobility anchor. In one example, the type of mobility depicted in FIG. 7 may be used for fast moving UEs 705 running applications that accept incoming connections, such as a Web server in the UE 705, a streaming server in the UE 705, and the like.

The UE 705 initially attaches to the first AG 515 and establishes a first IP session 745 with an endpoint in the first PDN 155 via the first BG 530. Here, the first BG 530 is the first hop router as well as the global mobility anchor for the UE 705. The UE uses an initial (e.g., first) IP address during the first IP session 745. As depicted, network traffic of the first IP session 745 is routed in the core network instance 510 between the first AG 515 and the first BG 530. The core network instance 510 uses tunnel-based forwarding 755 between the AGs 515-525 and the BGs 530-535.

At some point in time, the UE travels to a new location (e.g., to the service area of a new eNB) where no longer attaches to the first AG 515, but instead attaches to the second AG 520. However, the UE 705 still uses the initial IP address after moving to the new AG (e.g., second AG 520). The network 700 maintains the initial IP address by establishing tunnel 755 between the first AG 515 and the first BG 530 (when the UE is attached to AG 515) and by relocating this tunnel 755 between the second AG 520 and the first BG 530 (after the UE is attached to AG 520). The tunnel 755 is released only after the PDU session is released by the UE or by the network.

In some embodiments, a second IP session 750 is established after the UE 705 travel to the new AG (e.g., second AG 520). The second IP session 750 uses the initial IP address. As depicted, network traffic of the second IP session 750 is routed in the core network instance 510 between the second AG 520 and the first BG 530 via a tunnel 755.

FIG. 7 further depicts a session timeline 770 showing the establishment (and termination) of the first IP session 745 and the second IP session 750 over time. As depicted, the UE 705 is assigned a first IP address during the first IP session 745. This IP address is preserved as the UE travels through the network 700. When the second IP session 750 is established, it uses the first IP address.

FIG. 5-7 depict simplified network architecture, provided for illustrative purposes to explain how different types of continuity may be realized. While FIG. 5-7 each show a mobile communication network providing one type of continuity, a mobile communication network is not restricted to providing only a single type of continuity at a time. Indeed, the disclosed mobile communication networks may provide a plurality of continuity types to a plurality of users. Further, a single user may establish multiple data sessions each having a different continuity type.

FIG. 8 is a block diagram illustrating one embodiment of a continuity selection policy 800. The continuity selection policy 800 includes a plurality of prioritized rules 805. Each prioritized rule 805 includes a priority field 810, a characteristic category field 815, a value field 820, and a required continuity type field 825.

As depicted, the continuity selection policy 800 may include a first rule (with first priority), where the characteristic category field is an application identity. Here, the rule value is the identity "com.skype.raider" and the required continuity type is "session-continuity." Accordingly, if the application "com.skype.raider" requests a data session (e.g., an IP session), then this first rule applies and a mobile unit 105 will establish a PDU session having a "session-continuity" type of continuity.

The continuity selection policy 800 may include a second rule (with second priority), where the characteristic category field is also an application identity. Here, the rule value is the identity "com.android.chrome" and the required continuity type is "no-continuity." Accordingly, if the application "com.android.chrome" requests a data session (e.g., an IP session), then this second rule applies and a mobile unit 105 will establish a PDU session having a "no-continuity" type of continuity.

Additionally, the continuity selection policy 800 may include a third rule (with third priority), where the characteristic category field is an application identity. Here, the rule value is the identity "com.live.camera.server" and the required continuity type is "address-preservation." Accordingly, if the application "com.live.camera.server" requests a data session (e.g., an IP session), then this rule applies and a mobile unit 105 will establish a PDU session having an "address-preservation" type of continuity.

Further, the continuity selection policy 800 may include a fourth rule (with fourth priority), where the characteristic category field is a destination IP address. Here, the rule value is the IP address "10.10.0.0/16" and the required continuity type is "session-continuity." Accordingly, if an application requests an IP session with the destination IP address of "10.10.0.0/16," then this rule applies and a mobile unit 105 will establish a PDU session having a "session-continuity" type of continuity.

Also as depicted, the continuity selection policy 800 may include a fifth rule (with fifth priority), where the characteristic category field is a transport protocol and destination port number. Here, the rule value is the protocol "TCP" and the destination port "80." The required continuity type is "no-continuity." Accordingly, if an application requests a data session that uses the TCP protocol and requests a destination port of 80, then this rule applies and a mobile unit 105 will establish a PDU session having a "no-continuity" type of continuity.

Finally, the continuity selection policy 800 may include a default rule (having last priority). The default rule defines a required continuity type for any data session request that does not match in other rule within the continuity selection policy 800. Here, the default continuity type is "no-continuity."

Figure 9:
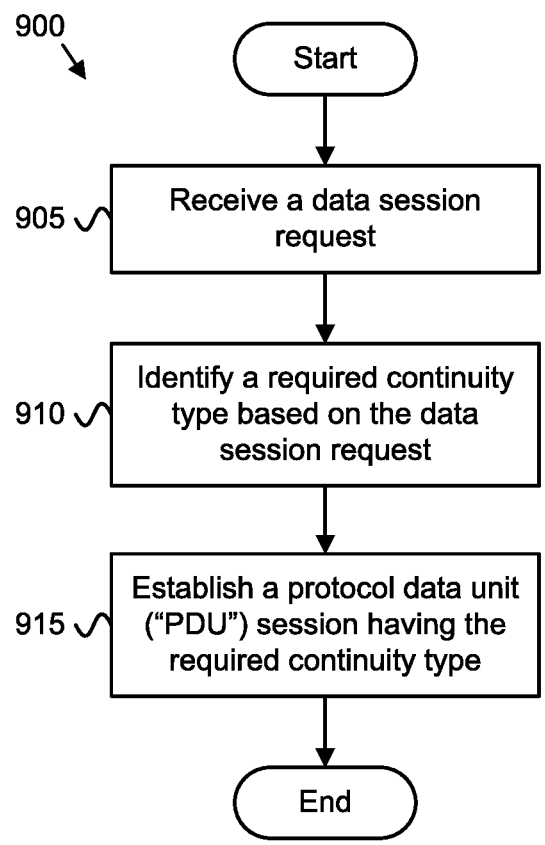
FIG. 9 is a schematic flow chart diagram illustrating another embodiment of a method supporting network slicing.

FIG. 9 is a schematic flow chart diagram illustrating one embodiment of a method 900 for providing data connectivity with various types of continuity. In some embodiments, the method 900 is performed by an apparatus, such as the remote unit 105 or a UE. In certain embodiments, the method 900 may be performed by a processor executing program code, for example, a microcontroller, a microprocessor, a CPU, a GPU, an auxiliary processing unit, a FPGA, or the like.

The method 900 may include receiving 905 a data session request. In one embodiment, an operating system running on the remote unit 105 (e.g., on the processor 205) receives a data session request from an application running on the remote unit 105. The data session request may include one or more parameters, including, but not limited to, an identity of the requesting application, a destination address, a destination domain name, a destination port number, and a transfer protocol.

The method 900 includes identifying 910 a required continuity type based on the data session request. The required continuity type may be selected from a plurality of continuity types supported by a mobile communication network. In one embodiment, the processor 205 the remote unit 105 identifies 910 the required continuity type. In certain embodiments, identifying 910 the required continuity type based on the data session request includes applying a continuity selection policy to the data session request. The continuity selection policy may be stored on a storage device and include one or more prioritized rules for selecting the required continuity type based on parameters of the data session request. In other embodiments, identifying 910 the required continuity type includes parsing the data session request to identify a continuity type parameter.

The method 900 includes establishing 915 a PDU session having the required continuity type between a mobile unit and the mobile communication network. The method 900 ends. In one embodiment, the processor 205 of the remote unit 105 controls the radio transceiver 225 to establish 915 the PDU session. In certain embodiments, establishing 915 the PDU session includes determining whether a PDU session having the required continuity type already exists and routing the requested data session through the already existing PDU session in response to the existing PDU session having the required continuity type.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a radio transceiver that communicates with a mobile communication network supporting a plurality of data session continuity types for data sessions,
wherein the plurality of data session continuity types comprise:
a first continuity type requiring a fixed mobility anchor,
a second continuity type that does not require a fixed mobility anchor, that maintains an initial network address for a period of time after receiving a successive network address and that releases the initial address after the period of time and
a third continuity type that does not require a fixed mobility anchor and does not have an overlap period between successive network addresses;
a storage device that stores a continuity selection policy; and
a processor that:
receives, from one of an application running on the apparatus and an operating system, a request to establish a data session;
identifies a request characteristic corresponding to the request to establish a data session, the request characteristic comprising at least one of: an application identifier, a requested destination address, a requested destination port, a requested transport protocol, and a requested destination domain name;
selects a data session continuity type based on the request to establish a data session by applying the continuity selection policy to the identified request characteristic, wherein the selected data session continuity type is selected from the plurality of data session continuity types supported by the mobile communication network
determines whether the selected data session continuity type matches a continuity type of an existing protocol data unit ("PDU") session established between a mobile unit and the mobile communication network with the mobile communication network;
routes the second data session through the existing data connection in response to the selected continuity type matching the data session continuity type of the second data connection; and
establishes a first data connection with the particular data network via the mobile communication network in response to the selected continuity type not matching the data session continuity type of the second data connection, the first data connection having the selected data session continuity type, the first data connection comprising a PDU session.

2. The apparatus of claim 1, wherein the continuity selection policy comprises one or more prioritized rules for selecting a data session continuity type based on characteristics of the request to establish a data session.

3. The apparatus of claim 2, wherein the continuity selection policy is provisioned by the mobile communication network, wherein the mobile communication network is one of a visited mobile communication network and a home mobile communication network.

4. The apparatus of claim 1, wherein the processor further requests a second data connection having a default data session continuity type, wherein the second data connection is established prior to the first data connection, the second data connection being a PDU session.

5. The apparatus of claim 4, wherein the processor searches the continuity selection policy for the default data session continuity type.

6. The apparatus of claim 1, wherein the processor further requests a second data connection without indicating a default data session continuity type and receives, from the mobile communication network, a default data session continuity type determined based on a network policy of the mobile communication network, wherein the second data connection is established prior to the first data connection, the second data connection being a PDU session.

7. The apparatus of claim 1, wherein the processor further:
detects a termination of a data session routed through the first data connection;
determines whether the first data connection becomes inactive for at least a threshold inactivity period after termination of the data session routed through the first data connection, wherein the processor determines the first data connection to be inactive in response to no open data sessions requiring the connectivity type corresponding to the first data connection; and
terminates the first data connection in response to the first data connection being inactive for at least the threshold inactivity period.

8. The apparatus of claim 7, wherein the continuity selection policy indicates the threshold inactivity period.

9. The apparatus of claim 7, wherein the processor receives the threshold inactivity period from the mobile communication network in response to establishing the first data connection having the selected data session continuity type.

10. The apparatus of claim 1, wherein the processor further receives an indication from the mobile communication network that the first data connection is terminated, wherein the mobile communication network terminates the first data connection in response to the first data connection being inactive for at least a threshold inactivity period.

11. The apparatus of claim 10, wherein a length of the threshold inactivity period is based on a data session continuity type of the first data connection.

12. The apparatus of claim 1, wherein the processor further:
receives a second request to establish a data session;

identifies a second request characteristic corresponding to the second request to establish a data session, the second request characteristic comprising at least one of: an application identifier, a requested destination address, a requested destination port, a requested transport protocol, and a requested destination domain name;

selects a second candidate data session continuity type based on the second request characteristic, wherein the second candidate data session continuity type is one of the first continuity type, the second continuity type, and the third continuity type;

determines whether the second candidate data session continuity type matches the data session continuity type of a second data connection established with the mobile communication network, the second data connection being selected from a set of one or more existing data connections;

routes the second data session through the second data connection established with the mobile communication network, if the second candidate data session continuity type matches the data session continuity type of the second data connection; and requests a new data connection having the second candidate data session continuity type if the second candidate data session continuity type does not match the data session continuity type of the second data connection.

13. The apparatus of claim 1, wherein the request to establish a data session includes a continuity type parameter, wherein the processor identifies the selected data session continuity type using the continuity type parameter.

14. The apparatus of claim 13, wherein the continuity selection policy comprises one or more prioritized rules for selecting a data session continuity type based on characteristics of the request to establish a data session, wherein the processor:
   determines whether the continuity type parameter conflicts with the continuity selection policy; and
   selects a replacement data session continuity type based on the continuity selection policy in response to the continuity type parameter conflicting with the continuity selection policy.

15. The apparatus of claim 1, wherein the processor receives the request to establish a data session from an application, wherein the processor selects the data session continuity type using a continuity selection policy rule that matches an identity of the application.

16. A method comprising:
   receiving, from one of an application running on a mobile unit and an operating system running on the mobile unit, a request to establish a data session;
   identifying a request characteristic corresponding to the request to establish a data session, the request characteristic comprising at least one of: an application identifier, a requested destination address, a requested destination port, a requested transport protocol, and a requested destination domain name;
   selecting a data session continuity type based on the request to establish a data session by applying a continuity selection policy to the identified request characteristic, wherein the selected data session continuity type is selected from a plurality of data session continuity types supported by a mobile communication network,
   wherein the plurality of data session continuity types comprise:
      a first continuity type requiring a fixed mobility anchor,
      a second continuity type that does not require a fixed mobility anchor, that maintains an initial network address for a period of time after receiving a successive network address and that releases the initial address after the period of time, and
      a third continuity type that does not require a fixed mobility anchor and does not have an overlap period between successive network addresses;
   determining whether the selected data session continuity type matches a continuity type of an existing protocol data unit ("PDU") session established between a mobile unit and the mobile communication network with the mobile communication network;
   routing the second data session through the existing data connection in response to the selected continuity type matching the data session continuity type of the second data connection; and
   establishing a first data connection with the particular data network via the mobile communication network in response to the selected continuity type not matching the data session continuity type of the second data connection, the first data connection having the selected data session continuity type, the first data connection comprising a PDU session between a mobile unit and the mobile communication network.

17. The method of claim 16, wherein the continuity selection policy comprises one or more prioritized rules for selecting a data session continuity type based on characteristics of the request to establish a data session.

18. The method of claim 17, wherein the continuity selection policy is provisioned by the mobile communication network, wherein the mobile communication network is one of a visited mobile communication network and a home mobile communication network.

19. The method of claim 16, further comprising:
   requesting a second data connection having a default data session continuity type, wherein the second data connection is established prior to the first data connection, the second data connection being a PDU session.

20. The method of claim 19, wherein the default data session continuity type is indicated by a continuity selection policy, the continuity selection policy stored on a storage device and comprising one or more prioritized rules for selecting a data session continuity type based on characteristics of the request to establish a data session.

21. The method of claim 16, further comprising:
   requesting a second data connection without indicating a default data session continuity type; and
   receiving, from the mobile communication network, a default data session continuity type determined based on a network policy of the mobile communication network, wherein the second data connection is established prior to the first data connection, the second data connection being a PDU session.

22. The method of claim 16, further comprising:
   detecting a termination of a data session routed through the first data connection;
   determining whether the first data connection becomes inactive for at least a threshold inactivity period after termination of the data session routed through the first data connection, wherein the first data connection is determined to be inactive in response to no open data sessions requiring the connectivity type corresponding to the first data connection; and terminating the first data connection in response to the first data connection being inactive for at least the threshold inactivity period.

23. The method of claim 22, wherein the threshold inactivity period is indicated the continuity selection policy.

24. The method of claim 22, further comprising receiving the threshold inactivity period from the mobile communication network in response to establishing the first data connection having the selected data session continuity type.

25. The method of claim 16, further comprising receiving an indication from the mobile communication network that the first data connection is terminated, wherein the mobile communication network terminates the first data connection in response to the first data connection being inactive for at least a threshold inactivity period.

26. The method of claim 25, wherein a length of the threshold inactivity period is based on a data session continuity type of the first data connection.

27. The method of claim 16, further comprising:
receiving a second request to establish a data session;
identifying a second request characteristic corresponding to the request to establish a data session, the second request characteristic comprising at least one of: an application identifier, a requested destination address, a requested destination port, a requested transport protocol, and a requested destination domain name;
selecting a second candidate data session continuity type based on the second request characteristic, wherein the second candidate data session continuity type is one of the first continuity type, the second continuity type, and the third continuity type;
determining whether the second candidate data session continuity type matches a data session continuity type of a second data connection established with the mobile communication network, the second data connection being selected from a set of one or more existing data connections;
routing the second data session through the second data connection established with the mobile communication network, if the second candidate data session continuity type matches the data session continuity type of the second data connection; and
requesting a new data connection having the second candidate data session continuity type if the second candidate data session continuity type does not match the data session continuity type of the second data connection.

28. The method of claim 16, wherein the request to establish a data session includes a continuity type parameter, wherein selecting the selected data session continuity type comprises identifying the selected data session continuity type based on the continuity type parameter.

29. The method of claim 28, further comprising:
determines whether the continuity type parameter conflicts with the continuity selection policy, the continuity selection policy stored on a storage device and comprising one or more prioritized rules for selecting a data session continuity type based on characteristics of the request to establish a data session; and
selecting a replacement data session continuity type based on the continuity selection policy in response to the continuity type parameter conflicting with the continuity selection policy.

30. The method of claim 16, wherein the request to establish a data session is received from an application, wherein selecting the selected data session continuity type comprises selecting the data session continuity type using an identity of the application.

* * * * *